Jan. 10, 1961 H. W. KLAS 2,967,505

ANTI-TORPEDO DEVICE

Filed March 9, 1943 8 Sheets-Sheet 1

Inventor
H. W. KLAS

By [signature]

Attorney

Jan. 10, 1961 H. W. KLAS 2,967,505

ANTI-TORPEDO DEVICE

Filed March 9, 1943 8 Sheets-Sheet 2

Inventor

H. W. KLAS

By [signature]

Attorney

Jan. 10, 1961 H. W. KLAS 2,967,505

ANTI-TORPEDO DEVICE

Filed March 9, 1943 8 Sheets-Sheet 3

Inventor
H. W. KLAS

By [signature]

Attorney

Inventor

H. W. KLAS

By [signature]

Attorney

Jan. 10, 1961 H. W. KLAS 2,967,505

ANTI-TORPEDO DEVICE

Filed March 9, 1943 8 Sheets-Sheet 5

Inventor

H. W. KLAS

By

Attorney

Jan. 10, 1961 H. W. KLAS 2,967,505

ANTI-TORPEDO DEVICE

Filed March 9, 1943 8 Sheets-Sheet 6

Inventor

H. W. KLAS

By [signature]

Attorney

Inventor
H. W. KLAS

By [signature]
Attorney

Jan. 10, 1961 H. W. KLAS 2,967,505

ANTI-TORPEDO DEVICE

Filed March 9, 1943 8 Sheets-Sheet 8

Inventor
H. W. KLAS

By [signature]

Attorney

United States Patent Office 2,967,505

Patented Jan. 10, 1961

2,967,505

ANTI-TORPEDO DEVICE

Harold W. Klas, 3105 W. St. Joseph St., Lansing, Mich.

Filed Mar. 9, 1943, Ser. No. 478,509

13 Claims. (Cl. 114—240)

(Granted under Title 35, U.S. Code (1952), sec. 266)

This invention relates to anti-torpedo devices for the protection of vessels and more particularly to devices adapted to be carried on the vessel and thereafter arranged within the water at a distance therefrom in which means are employed for controlling the buoyancy of the devices and for detecting the approach of a torpedo thereby to fire an explosive charge adjacent the oncoming torpedo sufficient to deflect or destroy the same.

Various devices have heretofore been proposed for protecting a vessel from attack by a torpedo, such devices comprising barriers composed of heavy plates, nets, chains, rods, springs, rotatable disks and the like secured to the vessel by booms or similar mechanisms, other devices for preventing an attack by a torpedo including compartments or "blisters" attached to or formed integrally with the hull of the vessel, or a copious quantity of resilient material secured to the hull of the vessel thereby either to deflect the torpedo or to absorb the shock of impact thereof, as the case may be. Such devices have, in general, been found to be unsatisfactory in service by reason of the complicated mechanisms employed and the considerable reduction in the mobility and speed of the vessel with which the devices are associated, and for the additional reason that in recent years modern torpedoes have increased in size, rate of travel through the water and in firing power to such an extent that these devices are no longer regarded as completely effective in protecting vessels against torpedo attack.

In the system of the present invention the protection of a vessel against attack by a torpedo is accomplished by a plurality of flexible tubes or streamers of material suitable for the purpose such, for example, as rubber or rubber coated fabric attached to a moving vessel and maintained at a predetermined distance therefrom by suitable towing gear in which a plurality of microphonic detecting devices are arranged within one of the streamers and an explosive charge is arranged throughout the length of each of the remaining streamers of sufficient size to destroy the oncoming torpedo as the charge is fired by a signal received from the microphonic detecting devices. Each microphone is adapted to receive signals through the surrounding water by reason of a flexible rubber sleeve arranged about each of the microphones respectively and adapted to exclude water therefrom. The microphones are in operative electrical connection with a filter device connected to a signal amplifier adapted to amplify signals of predetermined character received by the microphones from the torpedo when the torpedo is within a predetermined distance from the microphones thereby to fire an electro-responsive detonating device and explode the explosive charge within one of the flexible tubes as the torpedo moves into proximate relation thereto. The flexible tubes are hermetically sealed at the trailing end thereof and provided with a supply of compressed air sufficient to maintain the tube in a predetermined buoyant condition and prevent the collapse thereof by the pressure of the water within which the tube is immersed thereby providing an arrangement in which the tubes are adapted to be towed by the vessel through the water at a predetermined depth of submergence.

When employed for protecting a moving vessel the explosive streamers may be advantageously arranged in pairs and maintained in predetermined space relation with respect to each other by a tow line or cable connected at one end thereof to the vessel and at the other end to a plurality of deflecting plates, hereinafter referred to as otter boards arranged within the water. The tow cable is also employed to tow through the water a flexible streamer containing a microphonic detecting device secured thereto intermediate the outside explosive streamer and the otter board. The tow cable may be of any type suitable for the purpose having means for connecting the streamers to a source of compressed air and for establishing an electrical connection between the microphonic and detonating devices arranged therein and the signal filtering and amplifying mechanism on the vessel such, for example, as the flexible towing member disclosed in the copending application of James B. Glennon et al. for Anti-Torpedo Device, Serial No. 445,370, filed June 1, 1942.

In practice it has been found desirable to inflate the streamers prior to launching the streamers within the water and insert the detonator and explosive booster charge within the explosive streamer concurrently with the launching of the same within the water thereby to prevent the possibility of an accidental premature explosion of the explosive streamers while the streamers are carried aboard the vessel.

Furthermore, it has been found desirable to insert the aforesaid detonator and booster charge within the explosive streamer without releasing the air compressed within the streamer and thereafter to establish an operative connection by way of the aforesaid tow cable between the interior of the streamer and the continuous source of supply of compressed air on board the vessel.

One of the objects of the present invention is to provide a new and improved arrangement whereby a detonator and an explosive booster charge may be quickly and easily inserted within an explosive streamer without allowing the compressed air stored therein to escape.

Another of the objects is to provide a method of installing a detonator within an explosive streamer and of launching the streamer in which there is no possibility of prematurely exploding the streamer.

Another object is to provide an arrangement for quickly installing an electro-responsive detonator within an explosive streamer in which means are provided for preventing accidental short-circuiting of the firing circuit during the installing operation.

Another object is to provide a detonator adapted to be quickly inserted into an explosive streamer in operative relation with an explosive charge whereby the charge is adapted to be fired by the detonator regardless of the presence of moisture.

Still another object is the provision of a quick detachable detonator assembly adapted for use with an explosive streamer in which the assembly is invariably severed from the towing means as the explosive streamer is fired by the detonator.

A still further object is to provide a plurality of explosive streamers adapted to be towed through the water by a towing cable at a predetermined depth of submersion in which, when an explosive streamer has been exploded, the depth of submersion of the remaining streamers remains unchanged.

Still other objects, advantages and improvements will be apparent from the following description taken in connection with the accompanying drawings of which:

Figures 1, 2:
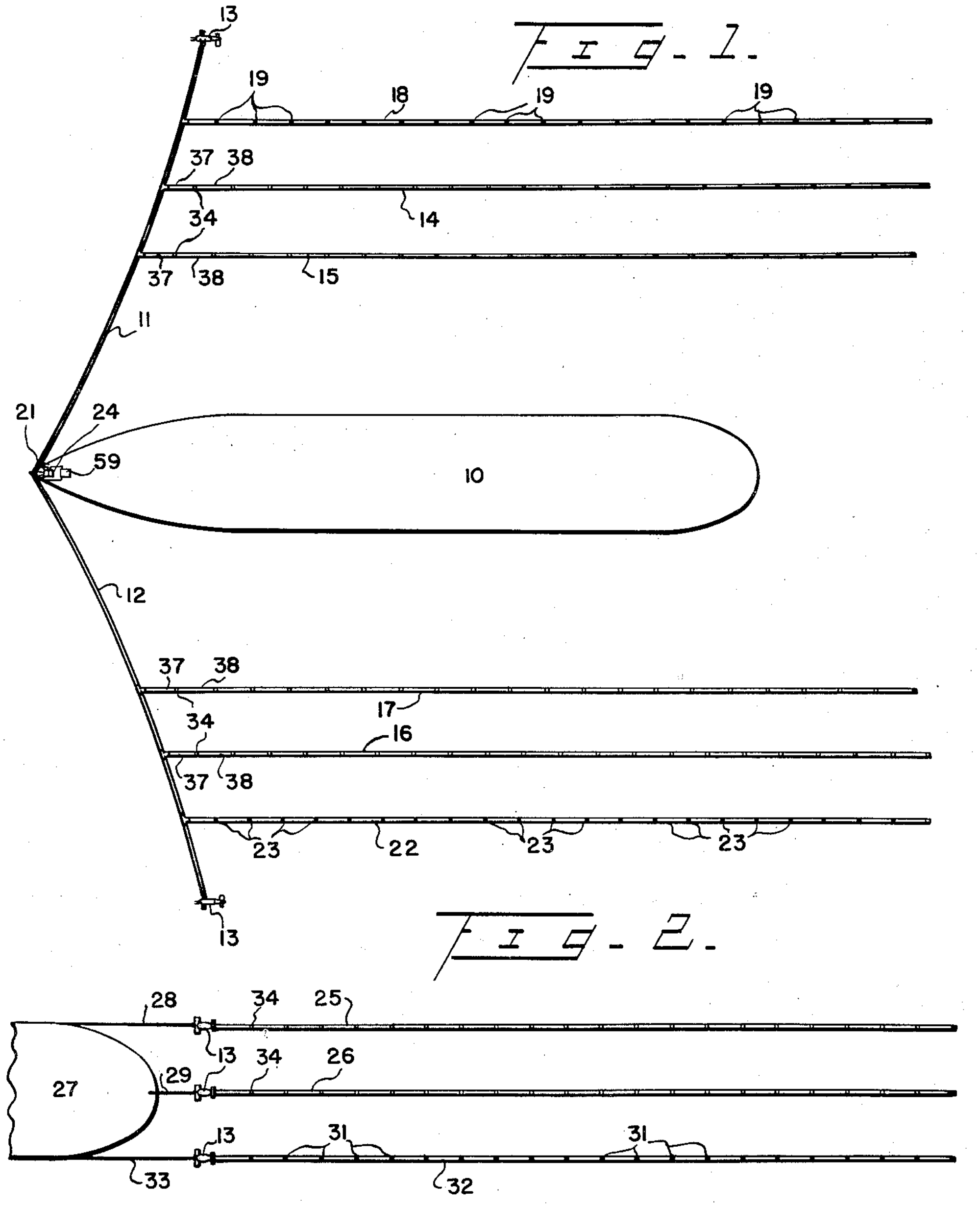
Fig. 1 shows in diagrammatic form a complete system according to a preferred embodiment of the invention.
Fig. 2 shows diagrammatically an alternative arrangement of streamers employing the present invention.

Referring now to the drawings and more particularly to Fig. 1 thereof there is shown thereon in diagrammatic form a vessel 10 having a pair of towing cables 11 and 12 connected thereto, each of the towing cables having an otter board 13 secured to the end thereof adapted to maintain the towing cables at an angle with respect to the vessel as the vessel moves through the water. Each of the towing cables 11 and 12 has secured thereto a pair of explosive streamers respectively, the pair of streamers connected to the cable 11 being designated by the numerals 14 and 15 and the pair of streamers connected to the towing cable 12 by the numerals 16 and 17. There is also connected to the towing cable 11 a flexible hose or streamer 18 intermediate the streamer 14 and the otter board 13 having a plurality of microphonic devices 19 therein adapted to control a signal amplifier 21 arranged on the vessel and explode the streamers 14 and 15 in succession as successive signals are received by the microphonic devices 19.

In a similar manner the towing cable 12 is connected to a tubular streamer or hose 22 having a plurality of microphonic devices 23 therein adapted to control the signal amplifier 24 arranged on the vessel and fire the explosive streamers 16 and 17 in succession as successive signals are received by the microphonic devices 23. There is also included preferably within each of the signal amplifiers 21 and 24, a filter mechanism whereby the associated firing circuit is adapted to be closed only in response to signals of predetermined character received through the water by the microphonic detecting devices.

On Fig. 2 is shown in diagrammatic form an alternative arrangement in which a pair of explosive streamers 25 and 26 are towed from the aft portion of the vessel 27 by means of the towing or supply cables 28 and 29 connected to the side and central portions of the vessel respectively. The streamer containing the microphonic detecting devices 31 is designated by the numeral 32 and connected to the vessel 27 by the towing or supply cable 33 generally in the manner illustrated. The arrangement includes a plurality of otter boards 13 respectively connected to the leading end of the streamers 25, 26 and 32 thereby to maintain the forward end of the streamers at a predetermined depth of submersion during the towing process. The microphonic devices 31 are adapted to control a signal amplifier similar to the amplifier 21 or 24 of Fig. 1 and fire the streamers 26 and 25 in succession as successive signals are received by the microphonic devices thereby to destroy at least two oncoming torpedoes before the explosive streamers require replacement.

The arrangement of Fig. 2 is particularly adapted for the protection of a convoy in which a plurality of ships such as the ship 27 illustrated are arranged in strategic positions about the convoy such that the convoy is effectively protected against attack by a torpedo fired from an outlying enemy vessel. It will, of course, be obvious that the microphonic detecting streamer 32 may effectively be towed from the port side of the vessel as shown in Fig. 2 or the starboard side, as the case may be, depending upon the relative position of the ship with respect to the convoy, in which case the streamers 25 and 32 are transposed.

As heretofore stated it is the usual practice to stow the entire gear aboard the vessel until the vessel has reached a point at sea at which it is desired to set the detecting system in operation. When this point is reached the speed of the vessel is usually reduced to a relatively slow rate of travel and the otter board 13 and towing cable secured thereto is payed out from the vessel. Concurrently therewith the inflated detecting and explosive streamers are lowered into the water and secured to the towing cable in any suitable manner and the necessary electrical and pneumatic connections between the streamers and the towing supply cable are established.

Prior to the launching of the anti-torpedo device the possibility of prematurely exploding the explosive streamers is prevented by reason of the detonator and explosive booster charge not being assembled within the explosive streamer in the space provided, the space being at this time sealed by a dummy cover or cap secured to a fitting or member included within the forward part of each explosive streamer and adapted to exclude moisture and dampness therefrom. During the launching operation the dummy cover is removed, the firing circuit is tested by momentarily connecting a suitable indicating instrument thereto and the detonator is operatively connected to the firing circuit. When this has been done, a booster explosive charge is placed about the detonator and the detonator and explosive booster charge are inserted within the explosive streamer in the space provided therefor, the detonator assembly including a member adapted to seal the aforesaid space and exclude water and moisture therefrom when the member has been secured in the assembled position to the fitting, as will more clearly appear as the description proceeds.

Figure 3:
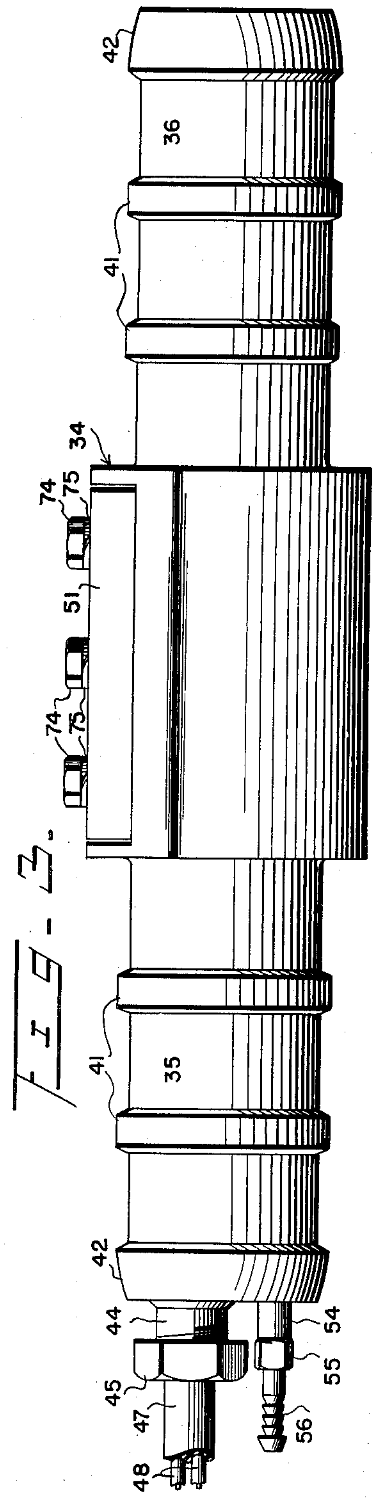
Fig. 3 is a detailed elevational view of the device with the streamer removed.
Figure 5:
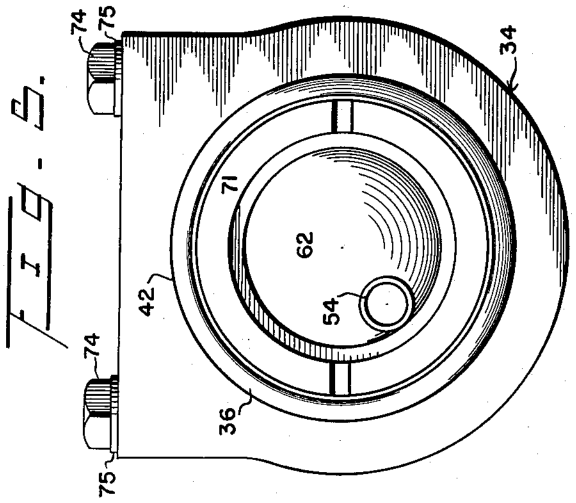
Fig. 5 is a view of the opposite end of the device of Fig. 3.
Figure 4:
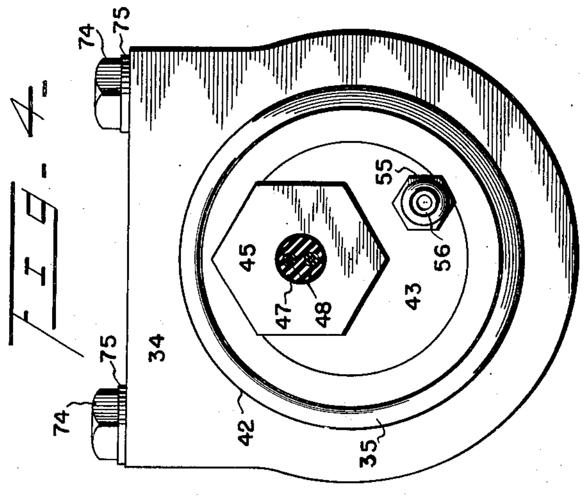
Fig. 4 is an end view of the device of Fig. 3.
Figures 6, 7, 8:
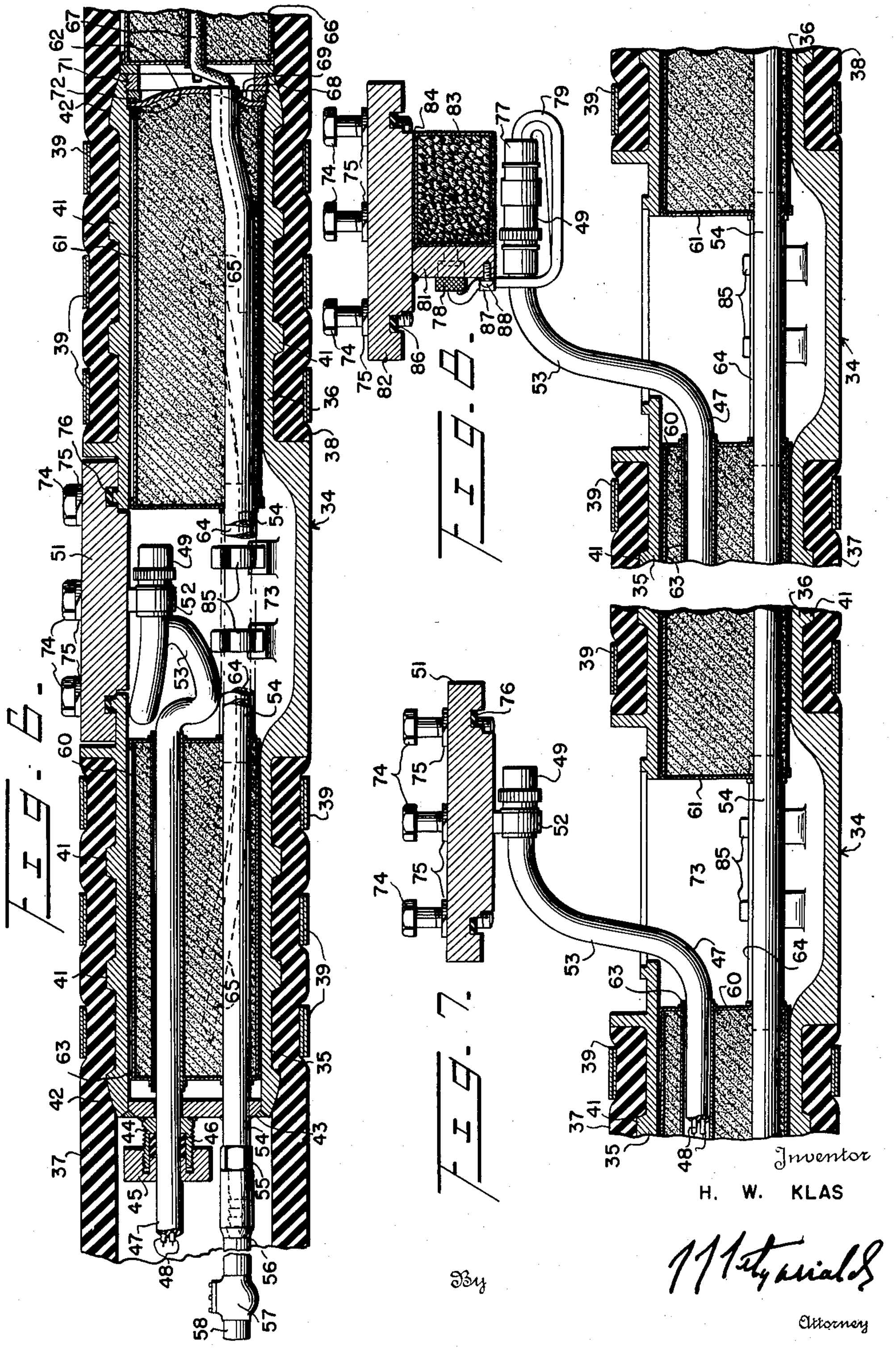
Fig. 6 is a longitudinal view taken substantially centrally through the device of Fig. 3.
Fig. 7 is a fragmentary sectional view similar to Fig. 6 showing the cover being removed.
Fig. 8 is a view similar to Fig. 7 showing the detonating device operatively connected to the firing circuit.

On Figs. 3 and 6 is shown in elevation and in section respectively a preferred form of device in accordance with the present invention comprising a tubular member indicated generally by the numeral 34 having projecting ends 35 and 36 to which the streamer hose comprising the sections 37 and 38 is secured as by the clamping devices 39, Fig. 6, a plurality of raised annular portions 41 and 42 being preferably provided to insure a firm water-tight connection between the flexible tubing and the member 34. The end 35 of the member 34 is provided with a cap 43 secured thereto in any suitable manner as by welding the parts together and provided with a member 44 having a nut 45 thereon adapted to compress the gland or packing 46 and thereby seal the cable 47 thereto. The cable 47 is provided with a pair of conductors 48 extending to a jack 49 detachably secured to the plate or cover 51 in any suitable manner as by the spring clip 52, sufficient slack being provided in the cable 47 as at 53 to enable the plate 51 to be withdrawn from the member 34 to the position shown in Fig. 7.

The cap 43 is also provided with a tube or duct 54 sealed thereto in any suitable manner as by welding the parts together, the tube 54 being provided with a coupling member secured thereto as by the nut 55 for establishing a connection by way of the tubular member 56 to a check valve 57 from whence the connection is continued by way of the duct 58 to a continuous source of supply of compressed air 59 arranged on the vessel when the explosive streamer has been connected thereto by way of the tow cable. The tube 54 extends through a container 60 and thence through the container 61, the end portion of the tube being sealed to the end portion 62 of the container 61 as by soldering the parts together. Each of the containers 60 and 61 is filled with an explosive charge such as TNT or the like. The container 60 is provided with a tube or conduit 63 within which the cable 47 is disposed. There is also arranged between the containers 60 and 61 a tubular member 64 having a pair of Primacords 65 arranged therein and extending into each of the containers whereby the explosion of the TNT within the container 61 in response to the operation of the detonating device causes the explosion of the TNT within the container 60 by reason of the explosive train established therebetween.

As the TNT within the chamber 61 explodes, the explosion is carried to the cans of explosive 66 arranged throughout the explosive streamer by the length of Primacord 67 having one end thereof inserted within the casing of the container 61 by way of the air tube 54. The container 61 is provided with an outwardly flared portion as at 68 adapted to engage a complementary recessed shoulder within the end portion 36 of the member 34 and thereby secure the container 61 thereto by reason of the annular spacing member 69 and ring nut 71 threaded within the end portion 36 of the member 34, a gasket 72 being preferably provided to insure an airtight connection between the end portion 62 of the container 61 and the member 34.

The containers 60 and 61 are arranged within the member 34 in predetermined space relation thereby to form a chamber 73 therebetween adapted to be sealed by the plate 51 secured thereto as by the bolts 74 and washers 75, a gasket 76 preferably being provided between the plate and the member 34 to insure a watertight connection therebetween.

Figure 9:
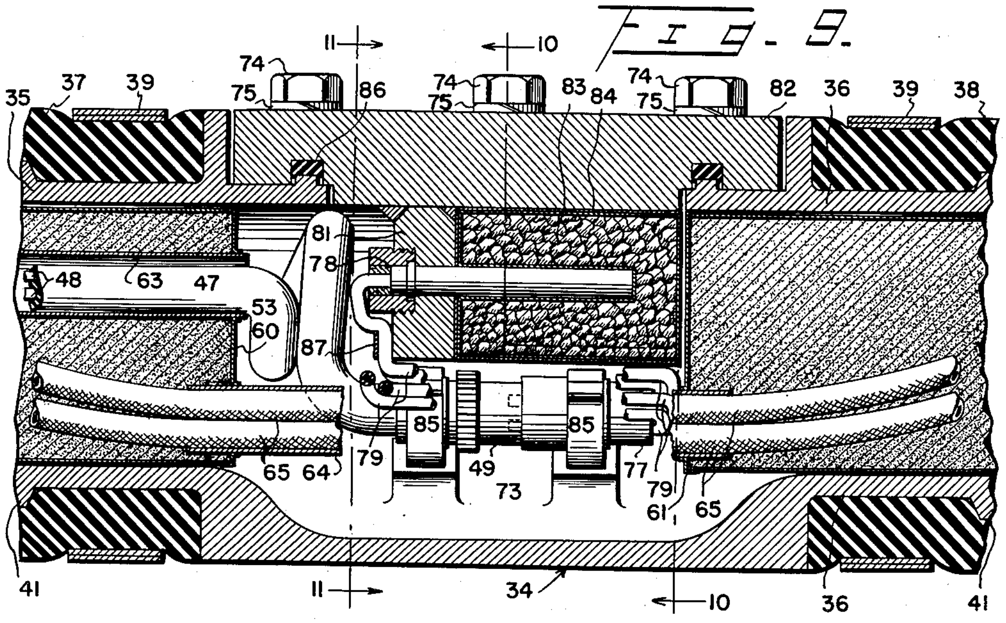
Fig. 9 is an enlarged longitudinal sectional view taken substantially centrally through the detonating device of Fig. 8 showing the device in the assembled position.
Figure 10:
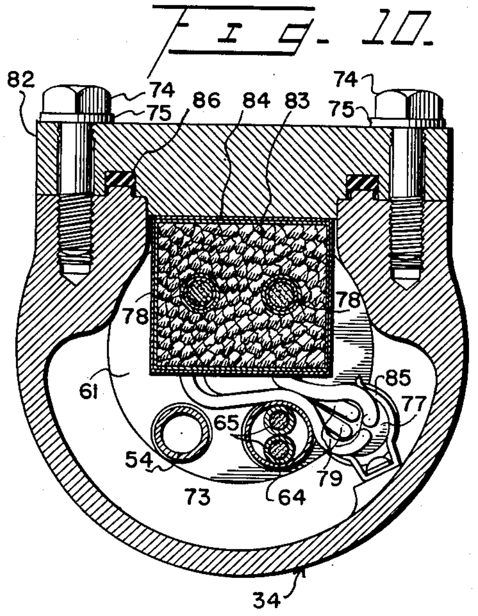
Fig. 10 is a sectional view taken along the line 10—10 of Fig. 9.
Figure 11:
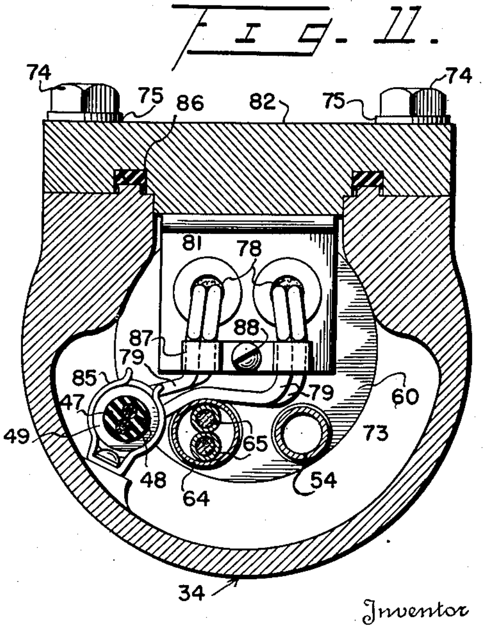
Fig. 11 is a sectional view taken along the line 11—11 of Fig. 9.
Figure 12:
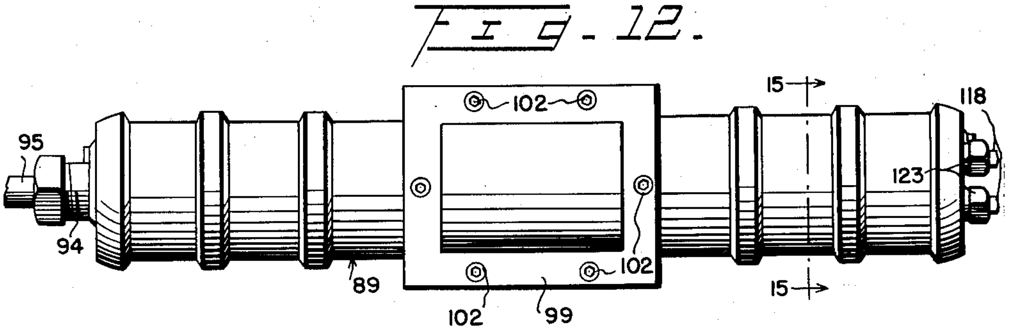
Fig. 12 is a detailed plan view of a modified form of the device.
Figure 13:
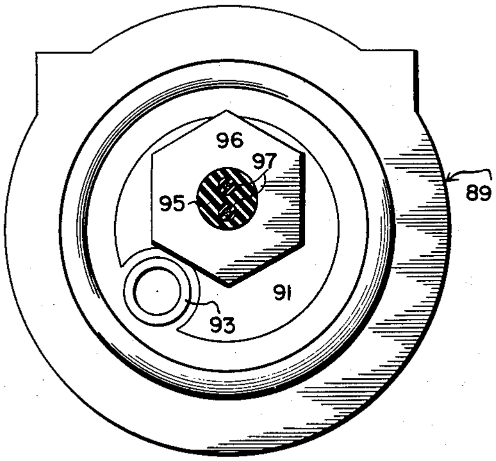
Fig. 13 is an enlarged end view of the device of Fig. 12.
Figure 14:
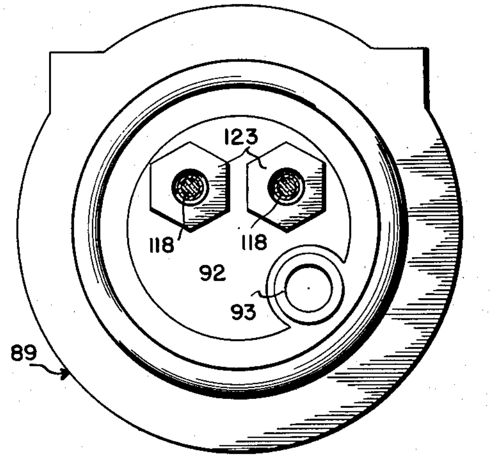
Fig. 14 is an enlarged view of the opposite end of the device of Fig. 12.
Figure 15:
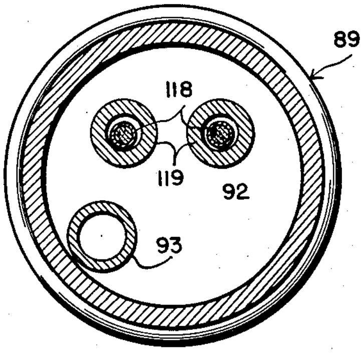
Fig. 15 is a sectional view somewhat enlarged taken along the line 15—15 of Fig. 12.

When it is desired to arm the explosive streamer by inserting the booster charge and detonating device therefor within the chamber 73, the bolts 74 are loosened and the plate 51 is removed from the member 34, Fig. 7. The jack 49 is removed from the clip 52 and the firing circuit is tested by momentarily connecting an indicating instrument or lamp suitable for the purpose to the jack 49. In the event that the firing circuit is found not to be closed at this time, a plug 77 connected to a detonator 78 as by the pair of conductors 79 is inserted into the jack 49 thereby operatively connecting the detonator to the firing circuit. The detonator 78 is secured to a downwardly projecting portion 81 of the plate 82 whereby an explosive booster charge 83 comprising a tetryl pellet or the like adapted to be brought into operative space relation with respect to the detonator is inserted within a chamber 84 secured to the plate 82. The jack 49 and plug 77 are now in readiness to be lowered within the chamber 73 and secured to the member 34 as by the clip supports 85 secured thereto. The detonator and booster charge assembly is now lowered into the assembled position within the chamber 73 in operative relation with respect to the explosive within the container 61, Fig. 9. The plate 82 is clamped in the assembled position by the bolts 74 thereby sealing the chamber 73 by reason of the gasket 86 arranged between the plate 82 and the member 34. The explosive streamer is now in readiness to assume the position within the water shown on Fig. 1 or Fig. 2, as the case may be. The arrangement of the detonator and booster charge assembly within the chamber 73 is facilitated by employing a clamp 87 adapted to secure the conductors 79 to the downwardly projecting portion 81 of the plate 82 to which the clamp is secured as by the screw 88. The connection of the plug 77 to the jack 49 and insertion of the detonator assembly within the chamber 73, it will be noted, causes the explosive streamer to be armed.

On Figs. 12 to 21 is shown an alternative form of the device in which the explosive of a pair of detonating devices is communicated to the cans of explosive throughout the length of the explosive streamer hose by a pair of fuses or Primacords in substantial abutting relation with the detonating devices without the interposition of an explosive booster charge therebetween. The device comprises a tubular member 89 adapted to be connected to the sections 37 and 38 of the explosive streamer and secured thereto as by the clamping devices 39. The hose sections 37 and 38 are inflated from a source of compressed air to a predetermined degree of pressure and maintained in the inflated condition by reason of the provision of a check valve arranged between the hose section 37 and the point of connection thereof to the supply cable. The member 89 is provided with end sections or caps 91 and 92, Fig. 19, secured in sealed relation thereto in any suitable manner as by welding the parts together, each of the end sections being provided with an aperture within which is arranged the duct or pipe 93 in sealed relation therewith thereby to establish an air connection between the streamer section 37 and the trailing portion of the explosive hose including the section 38. The cap 91 is also provided with a packing member or gland 94 adapted to seal the cable 95 thereto as the nut 96 is tightened.

Figure 16:
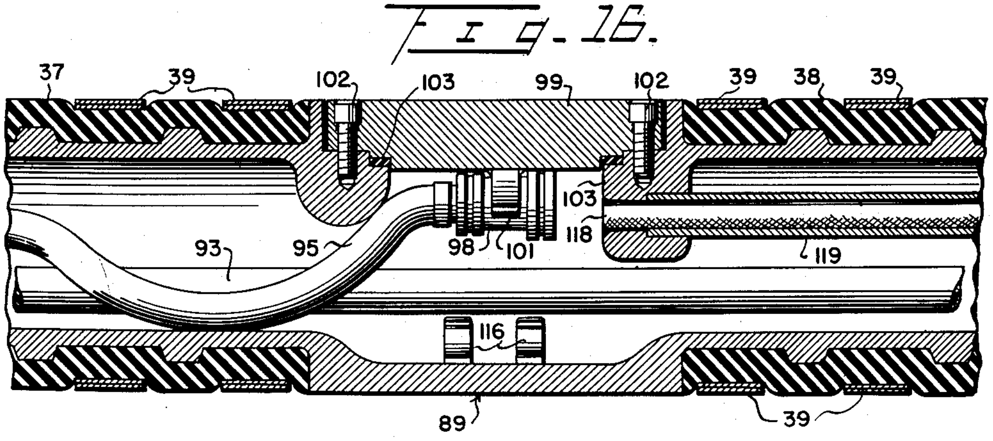
Fig. 16 is a fragmentary longitudinal sectional view taken substantially through the center of the device of Fig. 12.
Figure 18:
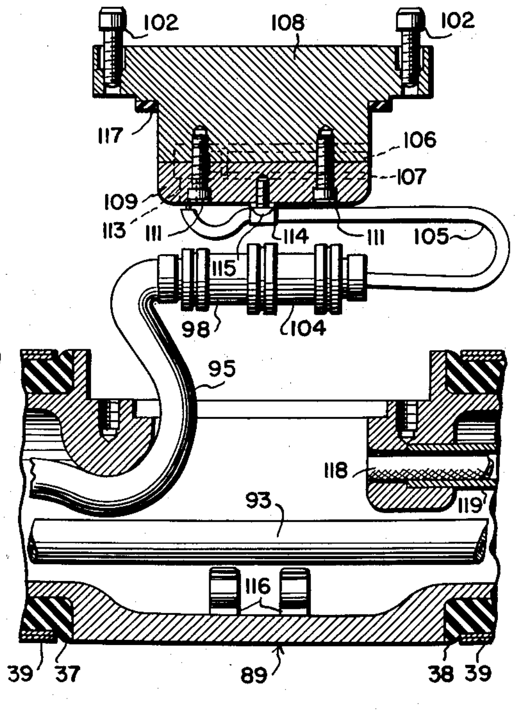
Fig. 18 is a view similar to Fig. 17 showing a modified form of detonating device operatively connected to the firing circuit.
Figure 17:
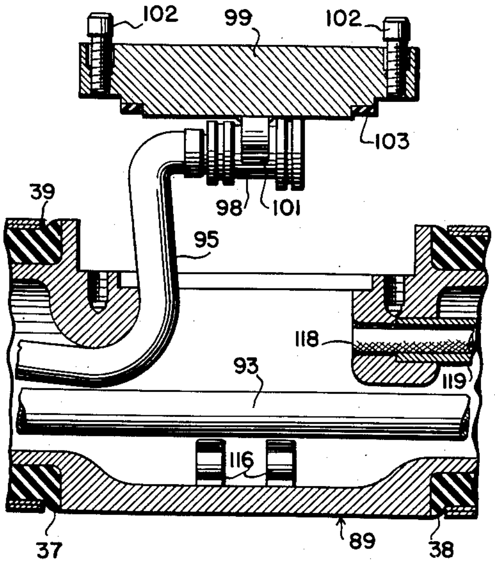
Fig. 17 is a fragmentary sectional view similar to Fig. 16 showing the cover being removed.
Figure 19:
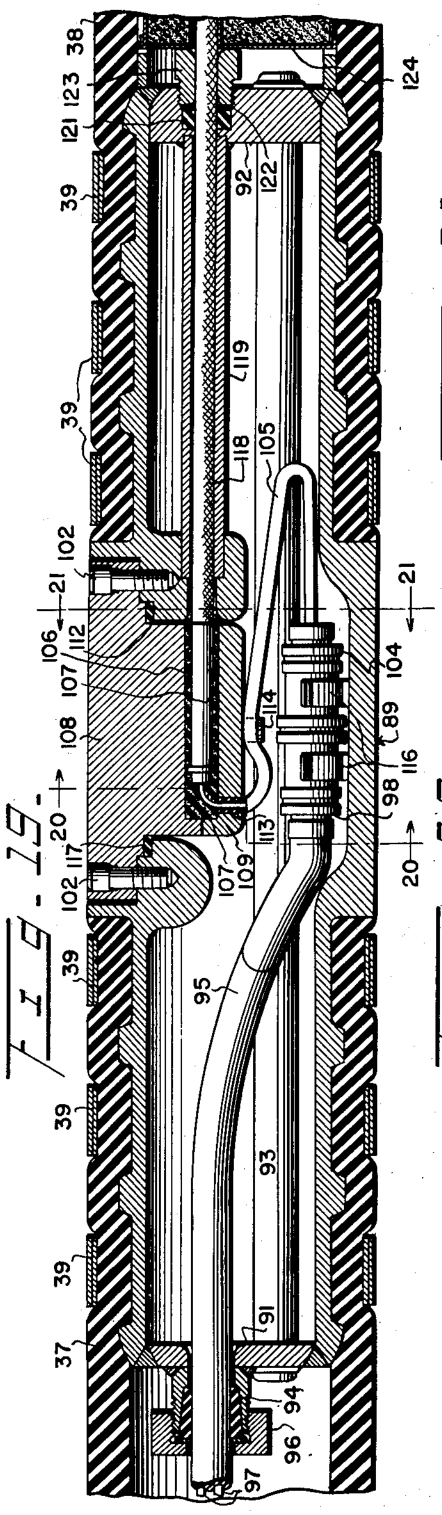
Fig. 19 is a fragmentary sectional view similar to Fig. 16 showing the detonating device in the assembled position.
Figure 21:
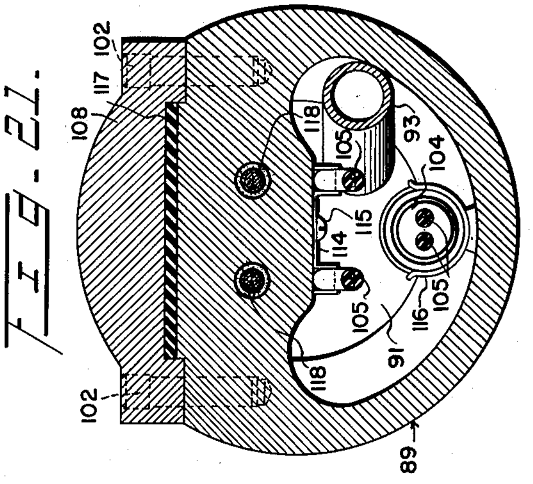
Fig. 21 is an enlarged sectional view taken along the line 21—21 of Fig. 19.
Figure 20:
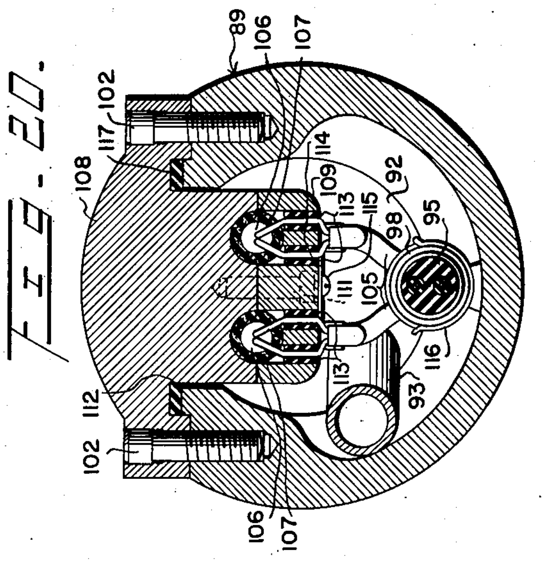
Fig. 20 is an enlarged sectional view taken along the line 20—20 of Fig. 19.

The cable 95 has arranged therein a pair of electrical conductors operatively connected to a jack 98 detachably secured to the dummy cover or plate 99 as by the spring 101, Fig. 16, sufficient slack being left in the cable between the gland 94 and the clip 101 to allow the plate 99 to be withdrawn from the tubular member 89 without detaching the jack 98 from the clip, Fig. 17. The plate 99 is secured to the member 89 by the screws 102 prior to launching the explosive streamer, a gasket 103 being employed preferably between the cover 99 and the member 89 to prevent the entrance of water or moisture within the member.

When it is desired to arm the explosive streamer the plate 99 is moved substantially to the position shown on Fig. 17 and the jack 98 is detached from the clip support 101, the firing circuit is tested and the jack is operatively connected to a plug 104 having two pairs of conductors respectively arranged within the cables 105 emerging therefrom in parallel connection. The pair of conductors within each of the cables 105 is operatively connected to an electro-responsive detonator 106 supported preferably by a resilient bushing or sleeve 107 of material suitable for the purpose such, for example, as rubber or any of the synthetic varieties thereof adapted to be clamped to the lower portion of the plate or cover 108 by a separable complementary portion 109 secured thereto as by the screws 111 in such a manner that the end of each of the detonators is in substantial alignment with the surface 112 of the cover 108. The conductors are insulated from each other and from the portion 109 of the cover 108 as by the insulating sleeves 113. A clamp 114 secured to the portion 109 as by the screw 115 is employed preferably to clamp the cables 105 thereto.

The jack 101 and plug 104 are adapted to be clamped to the member 89 as by the spring clips 116. When this has been done the plate 108 is lowered into position within the member 89 and secured thereto as by the bolts 102, Figs. 19 to 21, a gasket 117 being provided preferably between the cab 108 and the member 89 to render the joint therebetween watertight.

When the plate 108 has been assembled within the member 89 the end of each of the detonators 106 is brought into substantial abutting relation with respect to a pair of Primacords or fuses 118 arranged within the member 89 and supported throughout a portion of the length of each Primacord as by the tubular members 119. The Primacords 118 are hermetically sealed to the cap 92 as by the packing members 121, washers 122 and packing nuts 123 threaded within the cap member 92 and associated with each of the Primacords respectively. When the plug 104 is inserted within the jack 98 and the cover 108 has been inserted within the member 89, the explosive streamer is in an armed condition. By providing a pair of detonating devices 106 electrically connected together in parallel and a pair of Primacords or fuses respectively associated with each of the detonating devices and extending throughout the length of the explosive streamer in operative connection with each of the cans of explosive 124 arranged therein, the explosive streamer is invariably fired by the closure of the firing circuit including the pair of conductors 97 for the reason that the arrangement recited comprises a dual system for firing the explosive streamer.

Figure 22:
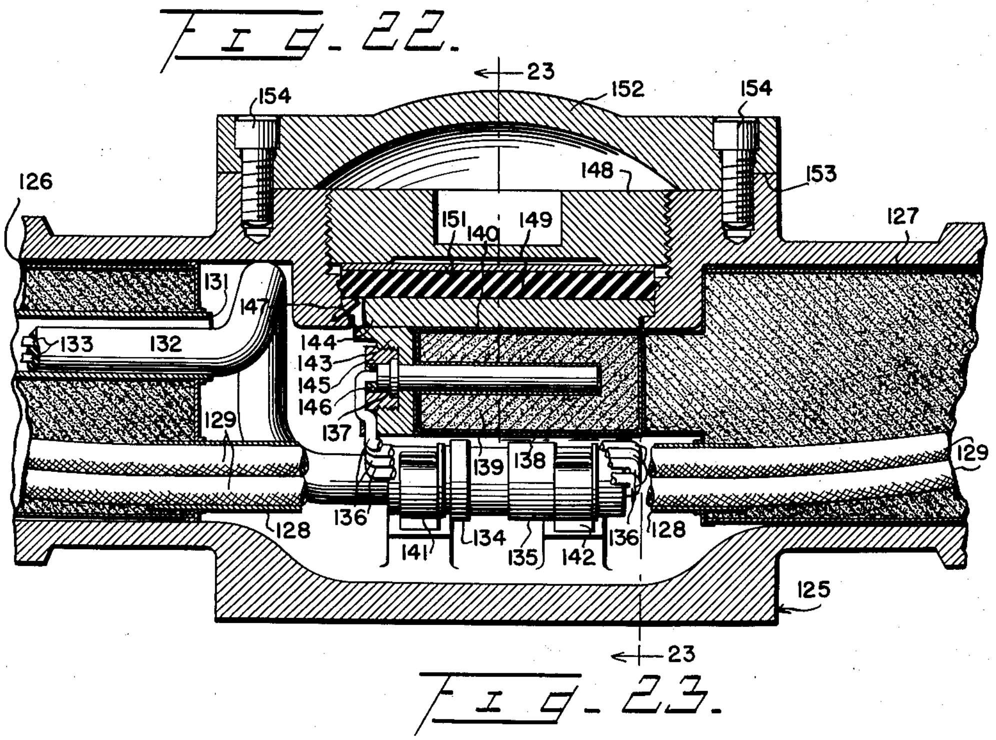
Fig. 22 is an enlarged sectional view taken substantially centrally and partly broken away of a still further modified form of the device; and, Fig. 23 is a sectional view taken along the line 23—23 of Fig. 22.
Figure 23:
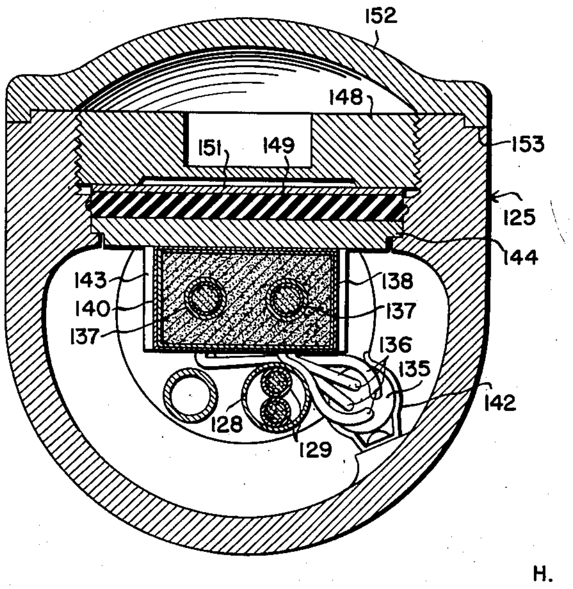

On Figs. 22 and 23 is shown a modified form of the device in which the detonator is arranged within a booster charge in substantial abutting relation with the main explosive charge, the device comprising a tubular member 125 adapted to receive and support a pair of containers 126 and 127, each of the containers having an explosive charge arranged therein. A tubular member 128 having a pair of Primacords or fuses 129 arranged therein extends between the containers thereby providing an arrangement in which the explosion occurring within the container 127 follows an explosive train comprising the Primacords 129 thereby to insure the explosion of the container 126. As the explosive charge within the container 126 is fired, the tubular member 125 is severed from the towing cable and the depth of submersion of the towing cable and remaining streamers, therefore, remains substantially unchanged as a result of the explosion of one or more of the explosive streamers secured thereto.

The container 126 is provided with a tubular member 131 within which is disposed the cable 132 having a pair of conductors 133 therein. The conductors 133 are connected to a jack 134 adapted to be engaged by the plug 135 having a plurality of conductors 136 secured thereto and extending to a pair of detonating devices 137 disposed within a chamber 138 having a booster charge 139 arranged with a container 140 adapted to be inserted within the chamber. The jack 134 and plug 135 are detachably secured to the member 125 as by the spring clips 141 and 142 respectively. The detonators 137 are secured to a downwardly projecting portion 143 of the support 144 as by the threaded member 145, the conductors 136 extending thereto being insulated from each other and from the member 145 in any suitable manner as by the insulating sleeves 146. The support 144 is preferably circular in shape and adapted to be inserted slideably into registered engagement with the member 125, a dowel pin 147 or a similar device being provided preferably to insure that the explosive booster charge within the chamber 138 is in operative relation with respect to the explosive within the chamber 127 when the detonator assembly is secured to the member 125 by the plug 148 threaded therein. The plug 148, it will be noted, is provided with a recess or slot adapted to be engaged by a suitable tool by means of which the plug may be tightened sufficiently to compress a resilient gasket 149 arranged intermediate the plug and the support 144 sufficiently to seal the support to the member 125, a washer 151 being preferably arranged between the plug and the support. There is also provided a cover or cap 152 having a registered portion 153 adapted to engage a complementary portion of the member 125 in watertight relation therewith as the cap is secured thereto by the bolts 154.

In operation the tubular member 125 is adapted to be sealed by the cover 152 during the time the explosive streamer is carried on board the vessel, it begins merely necessary to remove the screws 154 and the cover 152 to test the firing circuit, connect the plug 135 to the jack 134 and secure the plug and jack to the member 125 by insertion thereof within the spring clips 142 and 141 respectively before inserting the support 144 and the detonator assembly secured thereto within the member 125. The support is secured in watertight relation with respect to the member 125 by the plug 148 and gasket 149. The cover 152 may, if desired, be reassembled on the member 125 and secured thereto by the bolts 154 thereby providing a double seal between the interior of the member 125 and the surrounding water.

By providing a pair of detonating devices within the explosive booster charge in the manner disclosed in which the detonators are adapted to be fired by the closure of the firing circuit including the pair of conductors 133, the arrangement comprises a dual firing system in which the explosive streamer is invariably fired as the firing circuit is closed by the signal amplifier in response to signals received through the water from the microphonic devices within the detecting streamer, the detonation of the complete length of streamer being further assured by the provision of one or more Primacords or fuses extending from the interior of the container 127 into operative connection with each of the cans of explosive arranged within the explosive streamer.

While the invention has been described in detail with respect to certain specific examples thereof which give satisfactory results, it will be understood by those skilled in the art, after understanding the invention, that various changes and modifications may be made without departing from the spirit and scope of the invention and it is intended, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. In a device of the character disclosed for destroying a torpedo, a flexible tubular member adapted to be arranged within the water having a quantity of compressed air sealed therein, an explosive charge disposed within the member, means including a detonating device adapted to explode said explosive charge, and means for permitting said detonating device to be inserted within the tubular member in operative relation with respect to the explosive charge without releasing said compressed air.

2. In a device of the character disclosed for destroying a torpedo, a sealed tubular streamer having a quantity of compressed air therein, a chamber within said streamer from which the air pressure is excluded, an explosive charge arranged throughout the length of said streamer, a detonator adapted to fire said explosive charge, and means for permitting the detonator to be inserted within said chamber in watertight relation therewith without releasing said compressed air.

3. In a device of the character disclosed for destroying a torpedo, a flexible tubular member having an explosive charge therein adapted to be towed beneath the surface of a body of water, means for maintaining said tubular member continuously inflated to a predetermined degree of pressure, a chamber within said tubular member, a detonating device, and means for permitting said detonating device to be inserted within said chamber in operative relation with said explosive charge without reducing the degree of inflation of the tubular member, said last named means being adapted to exclude water from the chamber when the detonator is assembled therein.

4. In a device of the character disclosed for disabling a torpedo, an inflated flexible tubular member having an explosive charge therein adapted to be arranged within a body of water, a coupling included within said flexible member and having a chamber therein, a pair of containers arranged within said chamber, each of said containers having an explosive booster charge therein operatively connected to the explosive charge within said tubular member, means including a pair of baffle devices respectively secured to each of the end portions of said coupling for preventing a flow of air between the inflated tubular member and the interior of said coupling, said baffle devices having a duct secured thereto for equalizing the pressure within the tubular member on opposite ends of the coupling, a firing circuit including a pair of conductors arranged within a cable, means for sealing said cable to one of said baffle devices, a detonating device adapted to fire the booster charge within said containers in response to the closure of said firing circuit, detachable means for operatively connecting said pair of conductors to said detonating device, means including a cover adapted to support the detonating device in operative relation with the booster charge within said containers and exclude water from said chamber as the device is submerged within the water, and means for selectively closing said firing circuit.

5. In a device of the character disclosed for destroying a torpedo, a flexible tubular member adapted to be arranged within the water having a quantity of compressed air sealed therein, said tubular member comprising two sections, an explosive charge arranged within each of said sections, a tubular device for coupling said sections together, a chamber within said tubular device from which the air pressure is excluded, a pair of explosive filled containers respectively arranged within opposite end portions of said chamber, detonating means within the chamber adapted to fire the explosive within one of said containers, means operatively connected to said one of said containers for causing the explosive charge within one of said sections to be fired in response to the explosion of said one of said containers, and means including an explosive train operatively connected to each of said containers for exploding the explosive charge within the other of said sections as the said one of the containers is fired by the detonating means.

6. In a device of the character disclosed for destroying a torpedo, a sealed tubular streamer comprising a pair of sections adapted to be submerged within a body of water, means for coupling said sections together, means connected to the opposite end of one of said sections for towing the streamer through the water at a predetermined depth of submersion, an explosive charge within each of said sections, a chamber within said coupling means, means included within said towing means for connecting said streamer to a source of compressed air, detonating means arranged within said chamber adapted to fire the explosive charge within the section of streamer trailing from the coupling means, and means including an explosive train for firing the explosive charge within the remaining section of streamer concurrently with the explosion of the charge within the trailing section of streamer thereby invariably to disconnect the coupling means from the towing means as the streamer is exploded.

7. In a device of the character disclosed for destroying a torpedo, in combination, a supply line having one end thereof connected to a moving vessel, a paravane connected to the opposite end of said supply line adapted to cause the supply line to be moved through the water at a predetermined angle with respect to the direction of movement of the vessel, a plurality of explosive streamers operatively connected to said supply line and adapted to be towed through the water thereby in predetermined spaced relation, a plurality of coupling devices respectively connected to each of said streamers, each of said coupling devices having a sealed chamber therein, a plurality of explosive charges arranged respectively within each of said streamers, a plurality of detonating devices respectively arranged within each of said chambers adapted to fire the explosive charge within the associated streamer, means for firing said explosive streamers in succession as successive signals are received through the water, and means responsive to the explosion of each of said detonating devices for disconnecting the associated coupling device from said supply line as the associated streamer is exploded thereby to maintain said supply line and the remaining streamers at a predetermined depth of submersion.

8. In a device of the character disclosed for destroying a torpedo, a sealed tubular streamer having a quantity of compressed air therein, a chamber within said streamer from which the air pressure is excluded, an explosive charge arranged throughout the length of said streamer, an electro-responsive detonator adapted to fire said explosive charge, a pair of electrical conductors operatively connected to said detonator, a firing circuit, a slip connection device for connecting said pair of electrical conductors to the firing circuit, means for detachably securing said slip connection device to said streamer within said chamber, and means for permitting the detonator to be inserted within said chamber in watertight relation therewith without releasing said compressed air.

9. In a device of the character disclosed for disabling a torpedo, an inflated flexible tubular member having an explosive charge therein adapted to be arranged within a body of water, a coupling included within said flexible member and having a chamber therein, a pair of baffle devices respectively secured to opposite end portions of said coupling for preventing the flow of air between said chamber and the remaining portion of the tubular member, a fuse operatively connected to said explosive charge and extending within said chamber, means included within one of said baffle devices for hermetically sealing the fuse thereto, a detonating device adapted to ignite said fuse and thereby fire said explosive charge, and means for permitting the detonating device to be inserted within said chamber in operative relation with said fuse, said last named means being adapted to seal the chamber when the detonating device has been inserted therein.

10. In a device of the character disclosed for destroying a torpedo, a sealed tubular streamer having an explosive charge therein, means for towing the streamer through the water at a predetermined depth of submersion, said towing means having means for connecting the streamer to a source of compressed air thereby to maintain the streamer continuously inflated to a predetermined degree of pressure, a chamber within said streamer from which the compressed air is excluded, a plurality of detonating devices arranged within said chamber, means for establishing an operative connection between each of said detonating devices and said explosive charge, and means for operating said detonating devices simultaneously in response to a signal of predetermined character received through the surrounding water whereby the explosive charge is invariably fired in response to said signal.

11. In a device of the character disclosed for destroying a torpedo, a flexible tubular member having an explosive charge therein adapted to be towed beneath the surface of a body of water, means for maintaining said tubular member continuously inflated to a predetermined degree of pressure, a chamber within said tubular member having an aperture therein intermediate the interior of the chamber and the surrounding fluid, a detachable cover adapted to seal said aperture, detonating means, means for permitting the detonating means to be inserted through said aperture within the chamber in operative connection with said explosive charge, said last named means being adapted to seal the aperture, and means for clamping said cover in sealed relation to said aperture when the detonating means has been inserted within said chamber thereby additionally to seal said aperture.

12. In a device of the character disclosed for destroying a torpedo, a sealed tubular streamer having a quantity of compressed air therein, a coupling included within said streamer having a chamber therein from which the air pressure is excluded, an explosive charge arranged throughout the length of said streamer, an electro-responsive detonator adapted to fire said explosive charge, a firing circuit including a flexible cable, a slip connection device within said chamber to which one end of the cable is connected, a removable cover for said chamber having means for detachably securing said slip connection thereto, a pair of electrical conductors operatively connected to said electro-responsive detonator, a complementary slip connection device secured to said conductors adapted to engage the first named slip connection device and thereby establish an electrical connection between the detonator and said firing circuit, means for detachably securing said slip connection devices to said coupling within said chamber, and means effective when said cover has been removed for permitting the detonator to be inserted within said chamber in operative relation with respect to the explosive charge without releasing said compressed air, said last named means being adapted to exclude water from the interior of the chamber.

13. In an anti-torpedo device of the character disclosed, the combination of a flexible tubular member having an explosive charge therein adapted to be towed beneath the surface of a body of water, a coupling having an aperture therein included within said tubular member, a chamber within the tubular member in communication with said aperture, a detachable cap for said chamber adapted to seal the aperture, detonating means, means for permitting the detonating means to be inserted through said aperture within the chamber in operative connection with said explosive charge when the cap has been removed, a cover to which said detonating means is attached, means for clamping said cover to said coupling in registered watertight relation therewith, and means for clamping the detachable cap to said coupling in superimposed relation to said cover thereby additionally to seal said aperture.

References Cited in the file of this patent

UNITED STATES PATENTS

| | | |
|---|---|---|
| 1,305,877 | Carrau | June 3, 1919 |
| 1,310,568 | Heap et al. | July 22, 1919 |
| 1,353,811 | Muncy | Sept. 21, 1920 |
| 1,360,037 | Shonnard | Nov. 23, 1920 |
| 2,404,440 | Holm | July 23, 1946 |

FOREIGN PATENTS

| | | |
|---|---|---|
| 105,980 | Great Britain | May 7, 1917 |